United States Patent Office 2,986,537
Patented May 30, 1961

2,986,537

PREPARATION OF HIGH BULK DENSITY EXPANSIBLE THERMOPLASTIC MATERIALS

Philibert Camille Chaumeton, Rickmansworth, Herts, England, assignor to Shell Oil Company, a corporation of Delaware No Drawing. Filed Mar. 18, 1958, Ser. No. 722,138

Claims priority, application Great Britain Mar. 22, 1957

9 Claims. (Cl. 260—2.5)

This invention relates to expansible thermoplastic materials of high bulk density and to their production. The invention relates more particularly to expansible thermoplastic materials of high bulk density comprising styrene.

Methods directed to the production of expanded thermoplastic masses, i.e. thermoplastic masses of cellular structure, comprise those wherein particles of thermoplastic materials containing volatile hydrocarbons are heated under suitable conditions to softening temperatures. Expansible thermoplastic materials which retain their form at substantially atmospheric conditions of pressure and temperature consisting essentially of thermoplastic material in the form of discrete particles having incorporated therein one or more relatively volatile hydrocarbons are disclosed and claimed in co-pending application Serial No. 623,771, filed November 23, 1956, now U.S. Patent 2,893,963. These expandible thermoplastic materials are eminently suitable for the production of expanded thermoplastic masses therefrom. The presence therein of relatively volatile hydrocarbons under conditions permitting their gradual evolution, however, at times limits unduly the full use of these materials. Thus, the gradual evolution of volatile hydrocarbons therefrom often presents problems in the packaging of these materials as well as in their storage and transportation under conditions where adequate ventilation is not always possible.

It is found that improved results in subsequent use of the expansible thermoplastic materials are brought about by subjecting them to an initial partial expansion, for example, by brief contact with hot water or steam under conditions causing no substantial degree of agglomeration. Such treatment has the added effect of reducing the rate at which hydrocarbons are evolved from the material, and consequently eliminates to at least a substantial degree the problems of their packaging, storage and transportation in this regard. However, the treatment results in the conversion of the thermoplastic particles to expanded pellets, generally having a cellular structure, which have dimensions several times those of the original particles. The resulting extremely low bulk density of the resulting partially expanded thermoplastic material increases considerably the cost of packaging, storage and transportation.

It is an object of the present invention to provide an improved expansible thermoplastic material of high bulk density.

Another object of the invention is the provision of an improved expansible thermoplastic material of high bulk density comprising polystyrene. Other objects and advantages of the invention will become apparent from the following detailed description thereof.

In accordance with the present invention expansible thermoplastic materials of high bulk density are produced by partially expanding particulate thermoplastic material impregnated with a gaseous expansion agent and subjecting the partially expanded thermoplastic material to mechanical pressure. In a preferred modification of the invention the partially expanded thermoplastic material is subjected to cooling and ageing in air before being subjected to mechanical pressure.

The thermoplastic materials employed as starting materials in the execution of the invention comprise broadly thermoplastic materials in discrete form impregnated with a gaseous or relatively volatile, expanding or foaming agent. Particularly suitable starting materials comprising the thermoplastic materials impregnated with one or more normally gaseous and/or relatively volatile hydrocarbons. Thermoplastic materials suitable for the purpose of this invention comprise, for example, synthetic thermoplastic polymers such as polystyrene; copolymers of styrene and other vinylidine compounds such as polyalkyl acrylates such as polymethyl methacrylate, polyethyl acrylate, and the like. Thermoplastic starting materials are generally in discrete form as obtained by impregnating with a suitable gaseous expanding agent a polymeric material in the form of a moulding powder, or of beads or pearls such as are produced by a suspension polymerization process. Pearl polymers having a discrete particle size of from about 0.05 to about 5 mm. impregnated with the gaseous expanding agent are very suitable.

Particularly suitable thermoplastic starting materials comprise the hydrocarbon-impregnated expansible thermoplastic materials, for example, polystyrene, prepared by incorporatng therein a volatile hydrocarbon, such as butane, after the thermoplastic materials have been swollen with the aid of a liquid swelling agent which is solvent for said hydrocarbon, substantially as described and claimed in said Patent 2,893,963.

Expansible thermoplastic materials comprised in the suitable starting materials employed in the execution of the present invention comprise those in which the hydrocarbons incorporated in the thermoplastic material to serve as expanding or foaming agent are saturated hydrocarbons which are normally regarded as gases, i.e. are gases at about 15° C. and 760 mm. pressure and are hydrocarbons, or mixtures thereof, which can be liquefied under moderate pressure, i.e. under pressures of about 40 lbs./sq. in or less. Such hydrocarbons include the $C_4$ hydrocarbons and hydrocarbon mixtures consisting predominantly thereof. Hydrocarbon expanding agents include, for example, 2,2-dimethylpropane and mixtures containing this compound. Generally butane or mixtures containing substantial amounts of butane are used. The amount of the hydrocarbon expanding agent originally present in the thermoplastic starting material may vary considerably within the scope of the invention. In general it has been found that the presence of the hydrocarbon expanding agent in an amount ranging, for example, from about 5 to about 12%, calculated on the weight of the polymeric material, is satisfactory. Higher or lower amounts of the expanding agent may, however, be present in the starting thermoplastic material within the scope of the invention.

In accordance with the invention the thermoplastic material in discrete form, impregnated with the gaseous or relatively volatile expanding or foaming agent, is subjected to partial expansion. This may suitably be effected by subjecting the thermoplastic material impregnated with the expanding agent to an elevated temperature, for example, while suspended in a fluid medium. Thus, the partial expansion may be effected by contact with hot water or steam. The temperature at which the partial expansion is preferably carried out, and the duration of the treatment, will vary in accordance with the nature of the specific thermoplastic starting material and the expanding agent comprised therein. Conditions of temperature are maintained for a sufficiently long period of time to obtain substantial decrease in bulk density without, however, incurring any substantial degree of agglomeration. Polystyrene impregnated with hydrocarbons consisting essentially of butanes may be expanded by contact with hot water, for example, at a temperature range of from about 75°, and preferably from about 90°, to just below the boiling temperature of water.

As a result of the partial expansion treatment the discrete hydrocarbon-impregnated thermoplastic material is converted to expanded particles or pellets, often of cellular internal structure, which have dimensions several times those of the initially impregnated particles. The partially expanded thermoplastic material is separated from the liquid medium in which it was expanded by conventional means. Thus, if the expansion was carried out in water its removal may be effected by such means as centrifuging or the like.

In accordance with the invention the pellets of partially expanded thermoplastic material are collapsed by the application of elevated pressure. In a preferred method of carrying out the invention the partially expand thermoplastic material is cooled in air. The cooling in air is effected at ambient or at slightly elevated temperatures. It has been found that substantial advantage is obtained by subjecting the expanded thermoplastic material to ageing before subjecting it to the pressure treatment. The ageing is preferably effected in air. The duration of the ageing may vary considerably within the scope of the invention. In general it has been found that a period of ageing in air ranging, for example, from about one-quarter of an hour to about ten hours, and preferably from about one to about five hours, is satisfactory. Longer ageing periods may however be resorted to within the scope of the invention.

The partially expanded thermoplastic material is subjected to elevated pressures, preferably after the drying and/or ageing. The use of mechanical pressure is preferred. Pressures employed may vary considerably within the scope of the invention and will depend to some extent upon the specific thermoplastic material being treated and the bulk density desired in the finished product. In general the exertion of pressure in the range of, for example, from about 25 to 500 lbs./sq. in. gauge, is found satisfactory. Higher or lower pressures may, however, be employed within the scope of the invention. The pressure treatment is carried out at substantially ambient or lower temperatures. The pressure is maintained for a period of time sufficiently long to obtain a desired increase in bulk density and will vary in accordance with the specific material being treated. In general the duration of the pressure need not exceed a period of about two hours. The invention is in no wise limited, however, with respect to the time taken to effect the desired pressure treatment. The execution of the pressure treatment is generally controlled to obtain a bulk density of from about 5 to about 20, and preferably from about 10 to about 20 pounds per cubic foot. The pressure is however never applied beyond the point at which the bursting of any substantial quantity of the pellets or of the intercellular walls, if any, within the pellets occurs. In the treatment of polystyrene thermoplastic materials a desired bulk density of, for example, from about 5 to about 20 lbs./ft.³ is generally attained with the application of a pressure in the range of from about 25 to about 500 lbs./sq. in., and preferably from about 100 to about 200 lbs./sq. in., over a period of, for example, not more than from about five to about twenty minutes.

The expansible thermoplastic products of the present invention are not only free of the hazards heretofore associated with materials having a high rate of hydrocarbon evolution but have a bulk density which is sufficiently high to greatly facilitate handling, packaging, storage and transportation. They possess the ability to retain their relatively high density over prolonged periods of time. They are readily expanded to thermoplastic masses of porous character by the application of heat and lend themselves to efficient production of shaped porous articles therefrom by heating in moulds.

*Example I*

Polystyrene particles impregnated with hydrocarbons consisting essentially of butanes (A) were partially expanded by heating in water at 95°–98° C. The resulting partially expanded polystyrene pellets (B) were freed of water by centrifuging, cooled in air and then aged in air for a period of two hours. The aged partially expanded polystyrene pellets (B) were charged into a steel cylinder eight inches in diameter and two inches high, covered with a circular steel plate small enough to slide snugly into the cylinder. A pressure was then applied to the contents of the cylinder by means of a hydraulic press up to 100 lbs./sq. in. over a period of five minutes. The resulting compressed (collapsed) pellets of high bulk density, expansible polystyrene (C) had a bulk density of 10 lbs./ft.³. A portion of the compressed pellets (C) were heated in water at 95°–98° C. whereupon they regained their original (pre-collapsed) bulk density (i.e. the bulk density of pellets (B)). Separate portions of the compressed pellets (C) (i.e. the high bulk density expansible polystyrene) and of the partially expanded polystyrene pellets (B) were separately converted to blocks of expanded polystyrene of attractive appearance by heating in moulds in boiling water. The expanded polystyrene obtained from the high density expansible polystyrene pellets (C) were indistinguishable from those obtained from the partially expanded pellets (B).

*Example II*

High bulk density expansible polystyrene was prepared substantially as described in foregoing Example I. The resulting high bulk density, expansible polystyrene having a density of 10 lbs./ft.³ was stored at ambient temperature in air for twenty-four hours. Tests at the end of this period indicated no detectable increase in bulk density.

Tests under simulated conditions indicate that the material can be transported without need of pressure-resistant containers or other costly type of packaging.

*Example III*

The operation of foregoing Example I was repeated under substantially identical conditions but with the exception that the pressure during the pressure treatment used was 200 lbs./sq. in. The high bulk density, expansible polystyrene obtained was found to have a bulk density of 20 lbs./ft.³. A portion of the high bulk density, expansible polystyrene thus obtained was converted into blocks of expanded polystyrene by heating in moulds in boiling water.

*Example IV*

Twenty-three pounds of polystyrene beads, produced by suspension polymerization, together with forty pounds of water were introduced into a mixing vessel and agitated. 0.08 pound of calcium phosphate and 0.81 pound of methylene chloride were slowly added. The mixture was agitated for one and one-half hours. The vessel was then closed and butanes were introduced into the vessel. Approximately 2.5 pounds of butanes were introduced over a period of three hours. The maximum pressure obtained was about 30 lbs./sq. in., gauge. The resulting beads were treated with HCl, then washed and separated from the liquid medium by centrifuging. A portion of the hydrocarbon-impregnated polystyrene beads thus obtained were subjected to partial expansion by heating in water at 95°–98° C. The resulting partially expanded pellets were separated from water by centrifuging, cooled in air and allowed to stand for about three hours in air. A portion of the cooled and aged partially expanded polystyrene pellets were subjected to mechanical pressure of about 200 lbs./sq. in. with the aid of a hydraulic press substantially as described in the foregoing examples. The expansible high bulk density polystyrene pellets thus obtained had a bulk density of 20 lbs./ft.$^3$.

A portion of the high bulk density, expansible polystyrene thus obtained was converted to expanded polystyrene blocks by heating in moulds in boiling water. The resulting expanded polystyrene blocks had a bulk density of about 2.5 lbs./ft.$^3$.

The high bulk density, expansible, thermoplastic materials of the invention are of value in many important fields of application. The expanded thermoplastic masses produced therefrom are efficient heat-insulating materials for filling wall and door voids of refrigerators, and for giving strength to void space in aircraft wings, boat hulls and the like. They are useful in manufacture of many articles of commerce wherein both strength and light weight are needed, as in balls, fish net floats, packing discs, toys, etc.

The invention claimed is:

1. The process for the production of a particulate, expansible, high bulk density polystyrene which comprises heating a particulate polystyrene containing essentially butanes as a hydrocarbon expanding agent in an unconfined space at a temperature in the range of from about 75° to about 100° C., thereby obtaining a partial expansion of said polystyrene in the absence of any agglomeration, cooling the resulting partially-expanded polystyrene to substantially atmospheric temperature and ageing it in air for at least one-quarter hour, then subjecting the resulting partially-expanded, aged polystyrene particles to an elevated mechanical pressure in the range of from about 50 to about 300 lbs./sq. in. and maintaining said elevated pressure until the bulk density of said partially-expanded polystyrene has been reduced to a value in the range of from about 5 to about 20 lbs./cu. ft., without any substantial agglomeration of said particles and without bursting any substantial proportion of said particles and of any intercellular walls thereof.

2. The process for the production of discrete particles of an expansible, thermoplastic material having a bulk density of about 5 to about 20 lbs./cu. ft., which comprises subjecting, at a temperature no higher than ambient temperature, to an elevated mechanical pressure of at least about 25 lbs./sq. in., without bursting any substantial proportion of the particles and of any intercellular walls thereof, partially expanded discrete particles of a member of the group consisting of polystyrene and copolymers of styrene with another mono-vinylidene compound, impregnated with a volatile hydrocarbon expanding agent which can exist as a liquid under pressures no greater than 40 lbs./sq. in. and having been partially expanded by being subjected to an elevated temperature.

3. The process in accordance with claim 2, wherein a mechanical pressure in the range of from about 50 to about 300 lbs./sq. in. is maintained for a sufficient length of time to result in a bulk density of from about 5 to about 20 lbs./cu. ft. of said thermoplastic material subjected to said elevated pressure.

4. The process for the production of discrete particles of an expansible, thermoplastic material having a bulk density of about 5 to about 20 lbs./cu. ft., which comprises subjecting, at a temperature no higher than ambient temperature, to an elevated mechanical pressure in the range from about 25 to about 500 lbs./sq. in., without bursting any substantial proportion of the particles and of any intercellular walls thereof, partially expanded discrete particles of a member of the group consisting of polystyrene and copolymers of styrene with another monovinylidene compound, impregnated with a saturated hydrocarbon which is a gas at about 15° C. and 760 mm. pressure and can be liquefied under pressure no greater than 40 lbs./sq. in. and having been partially expanded by being subjected to an elevated temperature.

5. The process for the production of expansible particulate polystyrene having a bulk density of about 5 to about 20 lbs./cu. ft., which comprises subjecting, at a temperature no higher than ambient temperature, to an elevated mechanical pressure of at least about 25 lbs./sq. in., without bursting any substantial proportion of the particles and of any intercellular walls thereof, particulate polystyrene which has been impregnated with a hydrocarbon expanding agent which can exist as a liquid under pressures no greater than 40 lbs./sq. in. and partially expanded by heating the impregnated particles at a temperature of at least about 75° C.

6. The process in accordance with claim 5, wherein a mechanical pressure in the range of from about 50 to about 300 lbs./sq. in. is maintained for a sufficient length of time to result in a bulk density of from about 5 to about 20 lbs./cu. ft. of said partially expanded polystyrene.

7. The process in accordance with claim 6, wherein said partially expanded polystyrene has been cooled and aged for at least one-quarter hour in air after being partially expanded and before being subjected to said elevated pressure.

8. The process for the production of expansible particulate polystyrene having a bulk density of about 5 to about 20 lbs./cu. ft., which comprises subjecting, at a temperature no higher than ambient temperature, particulate polystyrene which contains a hydrocarbon expanding agent which can exist as a liquid under pressures no greater than 40 lbs./sq. in., and which has been partially expanded by heating it at a temperature in the range of from about 75° to about 100° C., to an elevated mechanical pressure in the range of from about 50 to about 300 lbs./sq. in., and maintaining said elevated pressure until the bulk density of said partially expanded polystyrene has been increased to a value in the range of from about 5 to about 20 lbs./cu. ft., without bursting any substantial proportion of said particles and of any intercellular walls thereof.

9. The process in accordance with claim 8, wherein said partially expanded polystyrene has been cooled and aged for at least one-quarter hour in air after being partially expanded and before being subjected to said elevated pressure.

References Cited in the file of this patent

UNITED STATES PATENTS

| | | |
|---|---|---|
| 2,787,809 | Stastny | Apr. 9, 1957 |
| 2,848,428 | Rubens | Aug. 19, 1958 |